US008949529B2

(12) United States Patent
Bellows et al.

(10) Patent No.: US 8,949,529 B2
(45) Date of Patent: Feb. 3, 2015

(54) CUSTOMIZING FUNCTION BEHAVIOR BASED ON CACHE AND SCHEDULING PARAMETERS OF A MEMORY ARGUMENT

(75) Inventors: Gregory H. Bellows, Austin, TX (US); Joaquin Madruga, Austin, TX (US); Ross A. Mikosh, Austin, TX (US); Barry L. Minor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 12/649,976

(22) Filed: Dec. 30, 2009

(65) Prior Publication Data
US 2011/0161608 A1 Jun. 30, 2011

(51) Int. Cl.
*G06F 12/08* (2006.01)

(52) U.S. Cl.
CPC ........ *G06F 12/0802* (2013.01); *G06F 12/0806* (2013.01); *G06F 12/0813* (2013.01); *G06F 12/0862* (2013.01); *G06F 2212/2542* (2013.01); *G06F 2212/601* (2013.01); *G06F 2212/6028* (2013.01)
USPC .......................................... 711/118; 711/129

(58) Field of Classification Search
None
See application file for complete search history.

(56) References Cited

U.S. PATENT DOCUMENTS 6,934,827 B2 * 8/2005 Wright et al. ................. 711/210
7,127,560 B2   10/2006 Cohen et al.
7,398,368 B2    7/2008 Marr et al.
2003/0120866 A1 * 6/2003 Stoutamire ................... 711/118
2005/0268038 A1 * 12/2005 Yasue .......................... 711/118
2007/0282838 A1 * 12/2007 Shavit et al. ..................... 707/8
2008/0005473 A1 *  1/2008 Chen et al. ................... 711/118
2009/0150576 A1    6/2009 Madruga et al.
2009/0327613 A1   12/2009 Nutter et al.

FOREIGN PATENT DOCUMENTS

CN          1806231 A      7/2006
WO      2005/116839 A1    12/2005

OTHER PUBLICATIONS

International Application No. PCT/EP2010/069263, International Search Report and The Written Opinion of the International Searching Authority, Apr. 18, 2011.

* cited by examiner

*Primary Examiner* — Kaushikkumar Patel
(74) *Attorney, Agent, or Firm* — Yudell Isidore PLLC; Matthew Talpis

(57) ABSTRACT

Disclosed are a method, a system and a computer program product of operating a data processing system that can include or be coupled to multiple processor cores. In one or more embodiments, each of multiple memory objects can be populated with work items and can be associated with attributes that can include information which can be used to describe data of each memory object and/or which can be used to process data of each memory object. The attributes can be used to indicate one or more of a cache policy, a cache size, and a cache line size, among others. In one or more embodiments, the attributes can be used as a history of how each memory object is used. The attributes can be used to indicate cache history statistics (e.g., a hit rate, a miss rate, etc.).

21 Claims, 11 Drawing Sheets

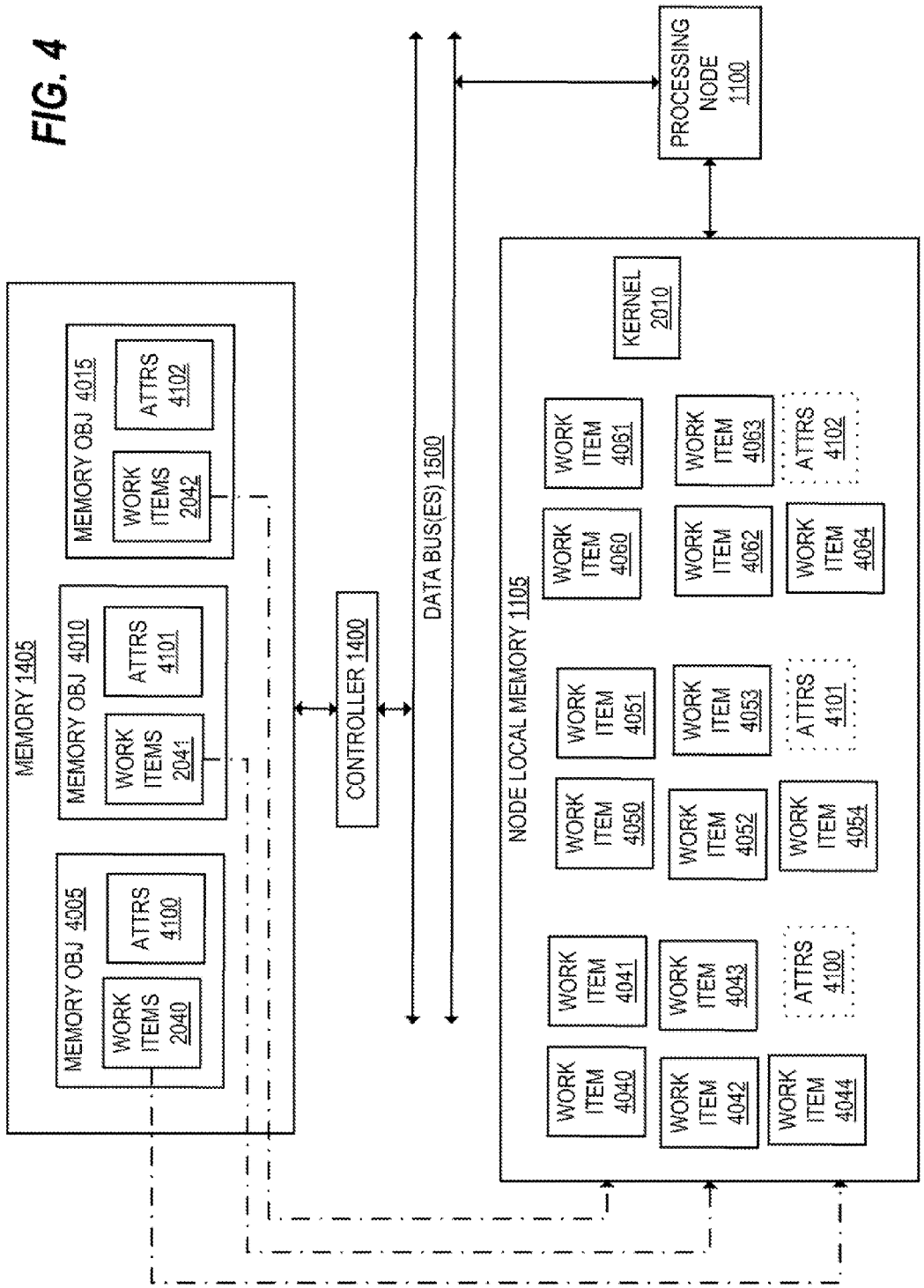

CUSTOMIZING FUNCTION BEHAVIOR BASED ON CACHE AND SCHEDULING PARAMETERS OF A MEMORY ARGUMENT

BACKGROUND

1. Technical Field

The present invention generally relates to multi-processor data processing systems and in particular to operations on data processing systems configured with multiple processing units. Still more particularly, the present invention relates to a method and system of utilizing cache line sizes in parallel processing of distributed work across multiple processing units of a multi-core data processing system.

2. Description of the Related Art

Multi-core data processing systems are widely utilized to enable parallel processing of data that can be divided into portions for completion. There are various different topologies of multi-core systems, of which non-uniform memory access (NUMA) system topology is one example. In the past, allowance of attaching tuning attributes directly to memory objects, used in parallel processing of data, have not been implemented to tune software managed caches.

BRIEF SUMMARY

Disclosed are a method, computer system architecture, and computer program product of operating a data processing system that can include or be coupled to multiple processor cores. In one or more embodiments, each of multiple memory objects can be populated with work items and can be associated with attributes that can include information which can be used to describe data of each memory object and/or which can be used to process data of each memory object. The attributes can be used to indicate one or more of a cache policy, a cache size, and a cache line size, among others. In one or more embodiments, a local store or memory of a processor core of the multiple processor cores can be partitioned based one the attributes of one or more memory objects. For example, the local store can be portioned into two partitions, where each partition corresponds to a memory object. In one or more embodiments, each partition can be created based on attributes associated with a corresponding memory object. For example, the partition can be created based on one or more of a cache policy, a cache size, and a cache line size indicated by the attributes associated with the corresponding memory object. In one or more embodiments, work items from the memory object can be copied into the partition of the local store of a processor core, and the processor core can process the work items from the partition.

In one or more embodiments, a partition in a local store can include or be a software cache. For example, the partition can be created by software, and software can be used to manage the partition. In one or more embodiments, attributes associated with a memory object can be used as a history of how the memory object is used. For example, the attributes can be used to indicate cache history statistics (e.g., a hit rate, a miss rate, etc.) of the partition.

The above summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE OF THE SEVERAL VIEWS OF THE DRAWINGS

The claimed subject matter and equivalents thereof will best be understood by reference to the following detailed description of illustrative embodiments when read in conjunction with the accompanying figures, wherein:

FIG. 1 provides a block diagram of a multi-node, distributed data processing system, according to one or more embodiments;

FIG. 2 provides a block diagram of a logical flow of a multi-node data processing system, according to one or more embodiments;

FIG. 3 provides a block diagram of a processing node, according to one or more embodiments;

FIG. 4 provides a block diagram of a portion of a data processing system, according to one or more embodiments;

FIG. 5A provides a block diagram of a local store or memory, according to one or more embodiments;

FIG. 5B provides a block diagram of a local store or memory where multiple work items can occupy a cache line, according to one or more embodiments;

FIG. 5C provides a block diagram of a local store or memory where a work item can occupy multiple cache lines, according to one or more embodiments;

FIG. 6 provides a block diagram of a local store or memory, according to one or more embodiments;

FIG. 7 provides a method of operating a data processing system, according to one or more embodiments;

DETAILED DESCRIPTION

Figure 1:
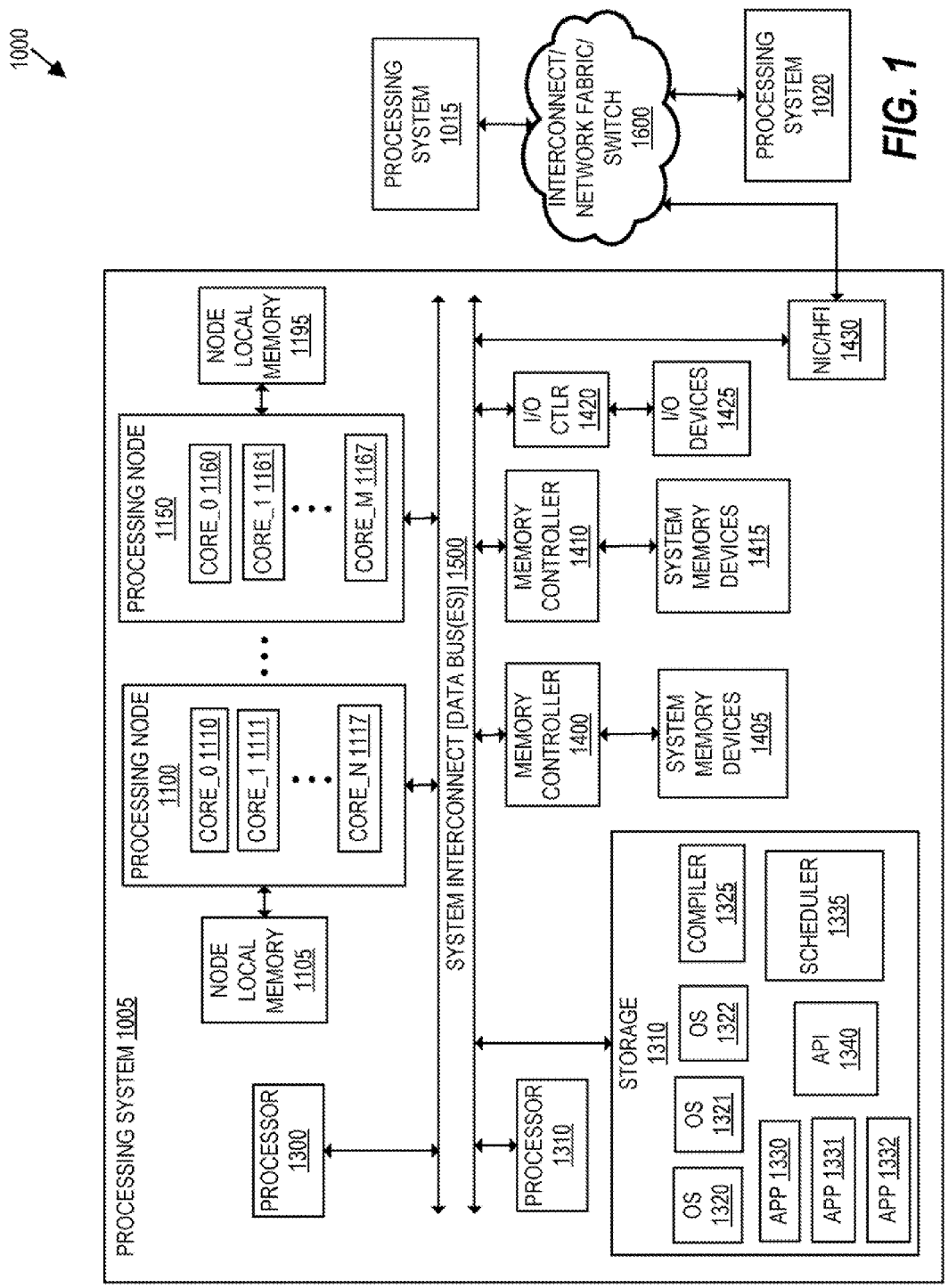

Disclosed are a method, computer system architecture, and computer program product of operating a data processing system that can include or be coupled to multiple processor cores. In one or more embodiments, each of multiple memory objects can be populated with work items and can be associated with attributes that can include information which can be used to describe data of each memory object and/or which can be used to process data of each memory object. The attributes can be used to indicate one or more of a cache policy, a cache size, and a cache line size, among others. In one or more embodiments, a local store or memory of a processor core of the multiple processor cores can be partitioned based one the attributes of one or more memory objects. For example, the local store can be portioned into two partitions, where each partition corresponds to a memory object. In one or more embodiments, each partition can be created based on attributes associated with a corresponding memory object. For example, the partition can be created based on one or more of a cache policy, a cache size, and a cache line size indicated by the attributes associated with the corresponding memory object. In one or more embodiments, work items from the memory object can be copied into the partition of the local store of a processor core, and the processor core can process the work items from the partition.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, the following terms, which are utilized herein, are defined as follows:

(1) Work Item: a base element of a data set (e.g., a byte, a string, an integer number, an floating point number, a pixel, an array, a data structure, etc.).
(2) NDRange Size: a number of work items in an index space.
(3) Kernel: a function that processes a work item to produce a result, where the function is implemented by one or more instructions executable by a processor core.
(4) Kernel Object: a kernel and argument(s) to use when executing the kernel.
(5) Work Item Remaining (WIR) Counter: a counter that tracks the number of work items within a work element and which is decremented each time one or more work items are removed by a processor core or node. The amount of the decrement is equal to the number of work items removed by the processor core or the node, and the counter is decremented until the counter value reaches or goes below zero.

As provided herein, the invention is applicable to any number of different configurations of such multi-core systems, including ones configured as large scale parallel processing system, or ones configured as non-uniform memory access (NUMA) processing system, or other type of multi-core processing system, including parallel processing systems. The descriptions provided herein assume no specific architecture, other than a multi-core architecture. However, certain features are assumed implemented in multi-node architectures (i.e., system with multiple processing nodes) in which one or more processing nodes exhibit low latency when accessing a global/shared memory structure, while other features are assumed to be implemented in multi-node architectures in which one or more processing nodes exhibit high latency when accessing the global/shared memory structure.

As further described below, implementation of the functional features of the invention is provided within processing nodes and involves use of a combination of hardware, firmware, as well as several software-level constructs. The presented figures illustrate both hardware and software components within an example distributed, multi-node computing environment in which multiple physically separate processing nodes, interconnected via a general system interconnect and/or a network interface device (NID) and/or host fabric interface (HFI) and/or one or more other forms of interconnects (e.g., switches, and the like), provide a distributed data processing system that executes one or more ND work sets via a plurality of processor cores. The illustrative and described embodiments assume that the system architecture may be scaled to a much larger number of processing nodes.

Turning now to the figures, and in particular to FIG. 1, a block diagram of a multi-node, distributed data processing system (DPS) is illustrated, according to one or more embodiments. As shown, DPS 1000 includes a processing system 1005, which can be coupled to one or more remote processing systems 1015 and 1020 via an interconnect 1600, such as a network fabric or switch. A illustrated, processing system 1005 can include two or more processing nodes of which processing nodes 1100 and 1150. Processing nodes 1100 and 1150 are coupled to system interconnect 1500, which serves as and may interchangeably be referred to as data buses.

In one or more embodiments, system interconnect 1500 provides connectivity within processing system 1005 to two or more devices, including memory controllers 1400 and 1410, a storage medium 1310, a processor 1300, and input/output (I/O) controller 1420. In one or more embodiments, I/O controller 1420 provides control over/by one or more I/O devices 1425, such as a pointing device, display monitor, and the like. Memory controllers 1400 and 1410 controls access to respective system memory devices 1405 and 1415. Depending on system design, memory controllers 1400 and 1410 may be assigned to respective processing nodes 1100 or 1150 and/or may be physically located on the processor chip or at some other location within the overall system architecture. It is appreciated that the presence of multiple memory controllers 1400 and 1410 is a design parameter, and processing system 1005 may be configured with a single memory controller, according to one or more embodiments.

In addition to system memory devices 1405 and 1415 of processing system 1005, processing nodes 1100 and 1150 can be coupled to respective associated node local memories 1105 and 1195, which can allow staging of work at the processing node without requiring the processing node to retrieve each piece of work individually from a system memory (e.g., one of system memories 1405 and 1415) or other remote (or high latency) location. In one or more embodiments, node local memory 1105 can be a shared memory for each of processor cores 1110-1117, and/or node local memory 1195 can be a shared memory for each of processor cores 1160-1167. For example, node local memory 1105 can be accessed in an asynchronous fashion by each of processor cores 1110-1117, and node local memory 1195 can be accessed in an asynchronous fashion by each of processor cores 1160-1167. For instance, node local memory 1105 can be accessed via direct memory access (DMA) by each of processor cores 1110-1117, and/or node local memory 1195 can be accessed via DMA by each of processor cores 1160-1167.

In one or more embodiments, each of processing nodes 1100 and 1150 includes two or more processor cores, although it is possible for the nodes to be single core nodes. As shown, processor node 1100 includes N+1 cores, numbered core _0 though core_N, where N is an integer greater than zero. Likewise, processor node 1150 comprises M+1 cores, numbered core _0 though core_M, where M is an integer greater than zero. So as to simplify the description of one or more embodiments, both N and M are assumed to be integer seven (7), such that processing node 1100 includes eight (8) processing cores 1110-1117 and processing node 1150 includes eight (8) processor cores 1160-1167. Where utilized herein, the term processing units are assumed to be synonymous with processor cores. In one or more embodiments, each processor core of processor cores 1110-1117 and 1160-1167 can implement an instruction set architecture (ISA) and can execute instructions from the ISA. In one or more embodiments, processor cores 1110-1117 can implement an ISA that is different from an ISA that can be implemented by processor cores 1160-1167.

The use of the integer variables "N" and "M" to cap the number of processor cores in respective processing nodes 1100 and 1150 merely indicates that each processing node can include a variable number of separate processor cores, with N and M being integers of any size greater than zero (0) (assuming a multi-core implementation for respective processing nodes). The number of processing nodes deployed in a given system architecture is implementation-dependent and can vary. It is appreciated that the embodiments described herein enables scaling to a much larger number of processing nodes and even larger number of processor cores. In one or more embodiments, processing system 1005 can be the source of one or more ND Range work sets that are generated and processed by the processor cores within DPS architecture 1000.

As further illustrated, processing system 1005 includes storage 1310, within which are stored one or more of the firmware and software components that enable generation of work and ND Range work sets for execution by one or more of the processing nodes. In one or more embodiments, storage 1310 can store of or of one or more operating systems (OSes) 1320-1322, one or more applications (APPs) 1330-1332, a compiler 1325, an application programming interface (API) 1340 and a scheduler 1335. In one or more embodiments, scheduler 1335 can include logic and/or program instructions that are executed by processor 1300, processor 1310 or a processing core (e.g., processing cores 1110-1117 and 1160-1167) to receive one or more kernels from a compiler and schedule the work (e.g., one or more kernels and/or data sets) for dispatch to/by one or more of the multiple processor cores within the DPS architecture 1000. In one or more embodiments, a data set that is to be operated on is retrieved by compiler 1325 from one or more of applications 1330-1332 and/or OSes 1320-1322, or from some other source (not illustrated herein). In one or more embodiments, compiler 1325 includes a just in time (JIT) compiler that can produce one or more kernels in accordance with a method or process associated with processing the data set. For example, application 1330 can implement a method or process associated with processing the data set, and in response to an execution of application 1330, the JIT compiler can produce one or more kernels to process the data set.

In one or more embodiments, processing system 1005 includes or is coupled to a switch or other global interconnect (e.g., interconnect 1600) to which multiple other processing systems may be connected. As illustrated, processing system 1005 is communicatively connected to remote processing systems 1015 and 1020 via interconnect 1600, which may be or include a network fabric or switch. As shown, connection to interconnect 1600 is provided via network interface controller (NIC) 1430, which may be or include a host fabric interface (HFI). As illustrated, NIC 1430 is coupled to system interconnect 1500. Interconnect 1600 may be a single general interconnect to which all nodes connect or may include one or more subnets (not shown) connecting a subset of processing nodes to each other and/or to processing system 1005, in one of several alternate configurations.

In one or more embodiments, one or more of processing systems 1015 and 1020 can provide additional computing resources within DPS 1000. For example, each of processing systems 1015 and 1020 can include one or ore structures and/or functionalities similar to or the same as described with reference to processing system 1005. In one or more embodiments, a relative distance between a remote computing device (e.g., one of processing systems 1015 and 1020) from a work staging area within processing system 1005, one or more processing cores included in the remote computing device can be described as exhibiting high latency during shared work retrieval and/or balancing. Those skilled in the art will appreciate that DPS architecture 1000 can include additional components, such as interconnect bridges, ports for connection to networks or attached devices, and the like (none of which are illustrated herein).

Figure 2:
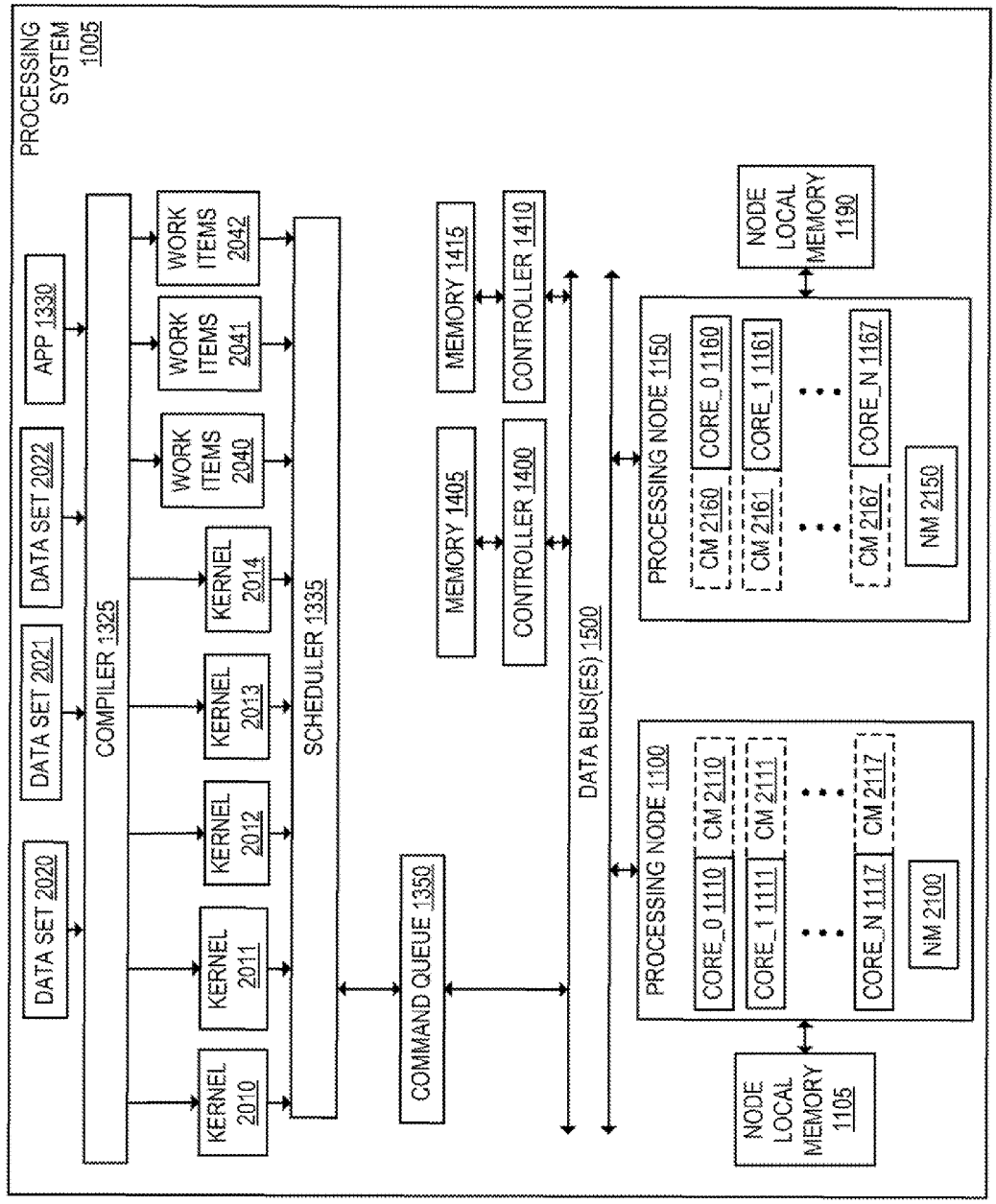

With reference now to FIG. 2, a block diagram of a logical flow of a multi-node data processing system is illustrated, according to one or more embodiments. In addition to the hardware structure presented processing system 1005 of FIG. 1, which has been previously described, FIG. 2 provides a one or more configurations and/or functionalities of the software and/or firmware components described with reference to FIG. 1 as well, which enable one or more functional features of one or more embodiments.

As shown, processing node 1100 is associated with a node mask (NM) 2100, and processing node 1150 is associated with a NM 2150. In one or more embodiments, each of node masks (NMs) 2100 and 2150 can provide a unique bit mask identifier to identify an associated processing node. In one or more embodiments, node masks are used to enable node level scheduling and/or routing of work, as described further below.

In a similar fashion, a core mask (CM) or processing unit mask (PUM) can provide a bit mask identifier to identify an associated/linked/encoded processing core and to uniquely identify the specific processor core from other processor cores within a node that includes the associated/linked/encoded processing core. As illustrated, cores 1110-1117 are associated with core masks (CMs) 2110-2117, respectively, and cores 1160-1167 are associated with CMs 2160-2167, respectively. For example, core_0 1110 is tagged with bit mask 2110, core_1 1111 is tagged with bit mask 2111, core_N 1117 is tagged with bit mask 2117.

In one example, each of NMs 2100 and 2150 can include a bit bask of $X_0X_1$, where $X_i$ can include values of "0" and "1". For instance, NM 2100 can include a bit mask of "10", and in another instance, NM 2150 can include a bit mask of "01". In another example, each of processor cores 1110-1117 and 1160-1167 can include a bit mask of $Y_0Y_1Y_2Y_3Y_4Y_5Y_6Y_7$, where $Y_j$ can include values of "0" and "1". In one instance, cores 1110 and 1160 can include a bit mask of "10000000". In a second instance, cores 1111 and 1161 can include a bit mask of "01000000". In another instance, cores 1117 and 1167 can include a bit mask of "00000001". In one or more embodiments, individual processing cores can be addressed and/or identified by a combination of node mask and core mask. In one example, a processing core can be identified by $X_0X_1Y_0Y_1Y_2Y_3Y_4Y_5Y_6Y_7$ or $Y_0Y_1Y_2Y_3Y_4Y_5Y_6Y_7X_0X_1$, depending on implementation. In one or more embodiments, processing system 1005 can include multiple nodes that can be associated with multiple node masks. In one example, each of the multiple node masks, associated with multiple processor cores, can include $X_0 \ldots X_P$, where P can be an integer greater than zero (0). In one or more embodiments, each of multiple processing nodes can include multiple processing cores that can be associated with multiple core masks. In one example, each of the multiple core masks can include $Y_0 \ldots Y_Q$, where Q can be an integer greater than zero (0).

Turning now to the functional blocks in the upper portion of the figure, the executable/execution code of example application 1330 is forwarded to compiler 1325, which processes the instructions/codes to one or more generate commands and/or one or more kernels 2010-2014 and/or one or more work items 2040-2042 from one or more of data sets 2020-2021, according to one or more embodiments. For example, the one or more commands can provide work divided into one or more work items 2040-2042, each associated with a kernel (e.g., a kernel of kernels 2010-2014). The kernels 2010-2014 are forwarded to scheduler 1335. In one or more embodiments, scheduler 1350 includes a scheduler that performs the functions of: (1) scheduling (placing) work elements into command queue 1350; (2) selectively allocating the work items to selected processor cores; generating an attached processing unit (APU) (e.g., node) mask (e.g., a bit mask that includes a combination of a node mask and a core mask) corresponding to the selected processor cores allocated/assigned the work item; and appending/linking or otherwise associating the APU mask to the work element by forwarding the APU mask to command queue 1350.

In one or more embodiments, the selectively allocating of the work items to selected processor cores involves and/or is based on a scheduling criteria that takes into account workload allocation and work balancing across processing system 1005 and/or DPS 1000, processing capabilities of the different types of processing units, e.g., CPUs (central processing units), GPUs (graphics processing units), SPUs (stream processing units), among others, and other factors, which may be programmed by the designer of the scheduler. In one or more embodiments, the division of work can be on a per processing node basis, rather than at the granularity of processor cores, the APU mask represents a node mask, identifying the specific processor node, and any processor core at that selected processing node may then consume the work items associated with the node mask.

In one or more embodiments, the work items associated with the bit mask can be routed from command queue 1350 to one or more processing cores via the associated bit mask. In one example, the work items associated with the bit mask can be routed from command queue 1350 to the one or more cores via the associated bit mask by a processor (e.g., core 1110, core 1160, processor 1300, etc.). In another example, the work items associated with the bit mask can be routed from command queue 1350 to the one or more cores via the associated bit mask by the one or more cores retrieving the one or more work items from command queue 1350 using the associated bit mask.

Figure 3:
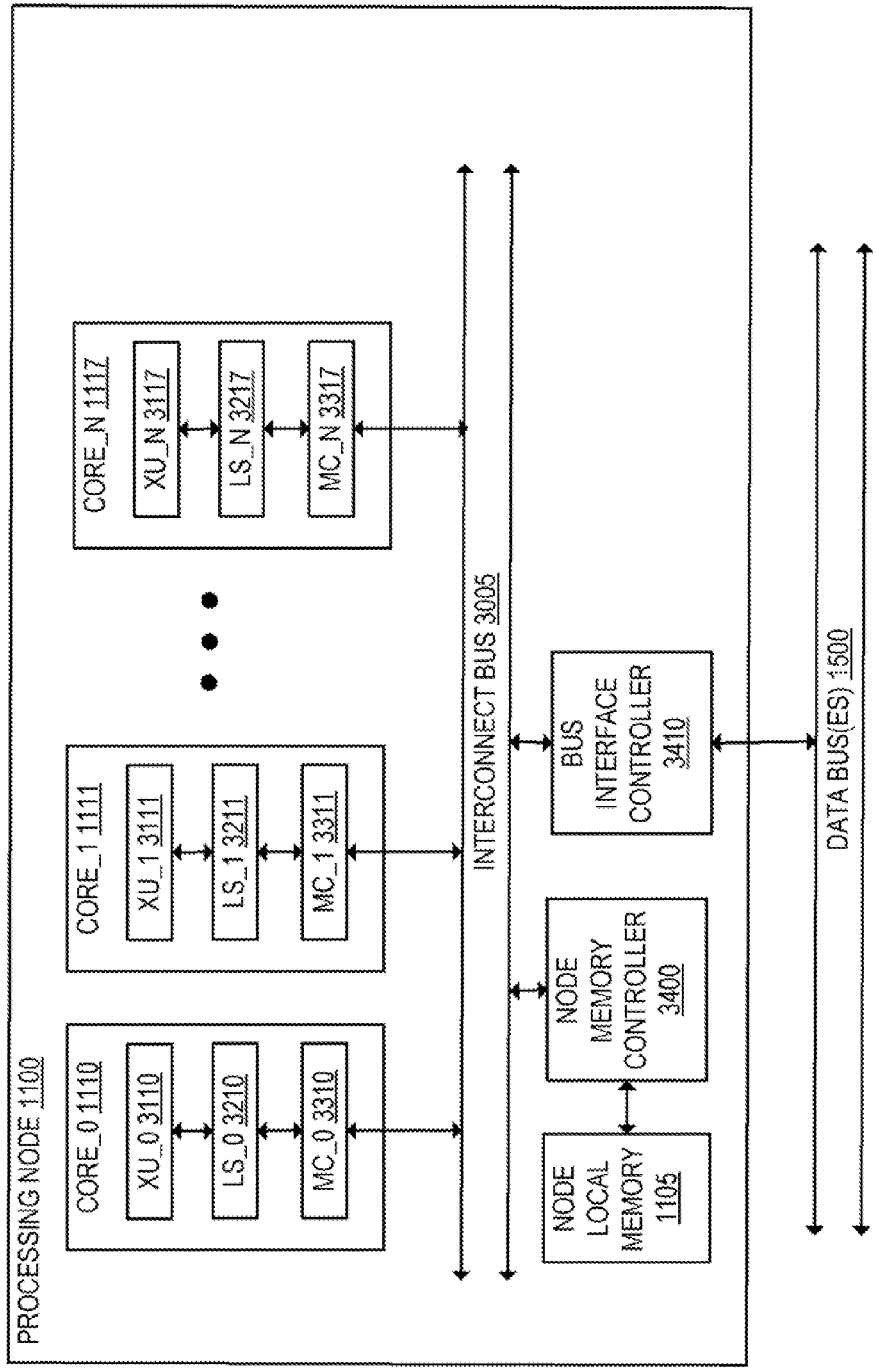

Turning now to FIG. 3, a block diagram of a processing node is illustrated, according to one or more embodiments. As shown, processing node 1100 can include processor cores 1110-1117 as described above. As illustrated, processor core 1110 can include an execution unit (XU_0) 3110, a local store (LS_0) or memory 3210 coupled to XU_0 3110, and a memory controller (MC_0) 3310 coupled to LS_0 3210; processor core 1111 can include an execution unit (XU_1) 3111, a local store (LS_1) or memory 3211 coupled to XU_1 3111, and a memory controller (MC_1) 3311 coupled to LS_1 3211; and processor core 1117 can include an execution unit (XU_N) 3117, a local store (LS_N) or memory 3217 coupled to XU_N 3117, and a memory controller (MC_N) 3317 coupled to LS_1 3217. In one or more embodiments, local stores 3210-32117 can store data and/or execution unit instructions for respective processor cores 1110-1117.

As shown, processor cores 1110-1117 can be coupled to an interconnect bus 3005 via respective memory controllers 3110-3117. In one or more embodiments, interconnect bus 3005 can couple two or more processing node elements to one another. As illustrated, a node memory controller 3400 and a bus interface controller 3410 can be coupled to interconnect bus 3005. As shown, bus interface controller 3410 can be coupled to data bus 1500. In one or more embodiments, processing node 1100 can include node local memory 1105, and node local memory 1105 can be coupled to node memory controller 3400. In one or more embodiments, a memory controller of a processor core, such as memory controller 3310, can include a direct memory access (DMA) controller that can be used to copy information from node local memory 1105 and/or memory 1405 to local store 3210, and the DMA controller can be used to copy information from local store 3210 to node local memory 1105 and/or memory 1405. In one or more embodiments, these data transfers can be asynchronous.

Turning now to FIG. 4, a block diagram of a portion of a data processing system is illustrated, according to one or more embodiments. As shown, memory 1405 can include memory objects 4005-4015 that can include respective work items 2040-2042 and respective attributes (ATTRS) 4100-4102. In one or more embodiments, a memory object (OBJ) can be created with one or more attributes that can include information which can be used to describe data of the memory object and/or which can be used to process data of the memory object. In one example, attributes 4100 can include information regarding a data size of a work item of work items 2040. For instance, a work item of work items 2040 can include a data size of two hundred and fifty-six (256) bytes. In one or more embodiments, attributes can be set for a memory object after the memory object has been created. In one or more embodiments, attributes associated with a memory object can include data that can be updated with use of the memory object. For example, attributes 4100 can include cache history statistics. For instance, cache history statistics of attributes 4100 can include one or more of a hit rate and a miss rate.

As shown, node local memory 1105 can include work items 4040-4044, 4050-4054, and 4060-4064 and kernel 2010. For example, work items 4040-4044 are included in work items 2040, work items 4050-4054 are included in work items 2041, and work items 4060-4064 are included in work items 2042. For instance, work items 4040-4044, 4050-4054, and 4060-4064 were copied from respective memory objects 4005-4015. In one or more embodiments, attributes 4100-4102 are inherited from respective memory objects 4005-4015 to provide information regarding handling and/or processing of respective work items 4040-4044, 4050-4054, and 4060-4064.

Figure 5A:
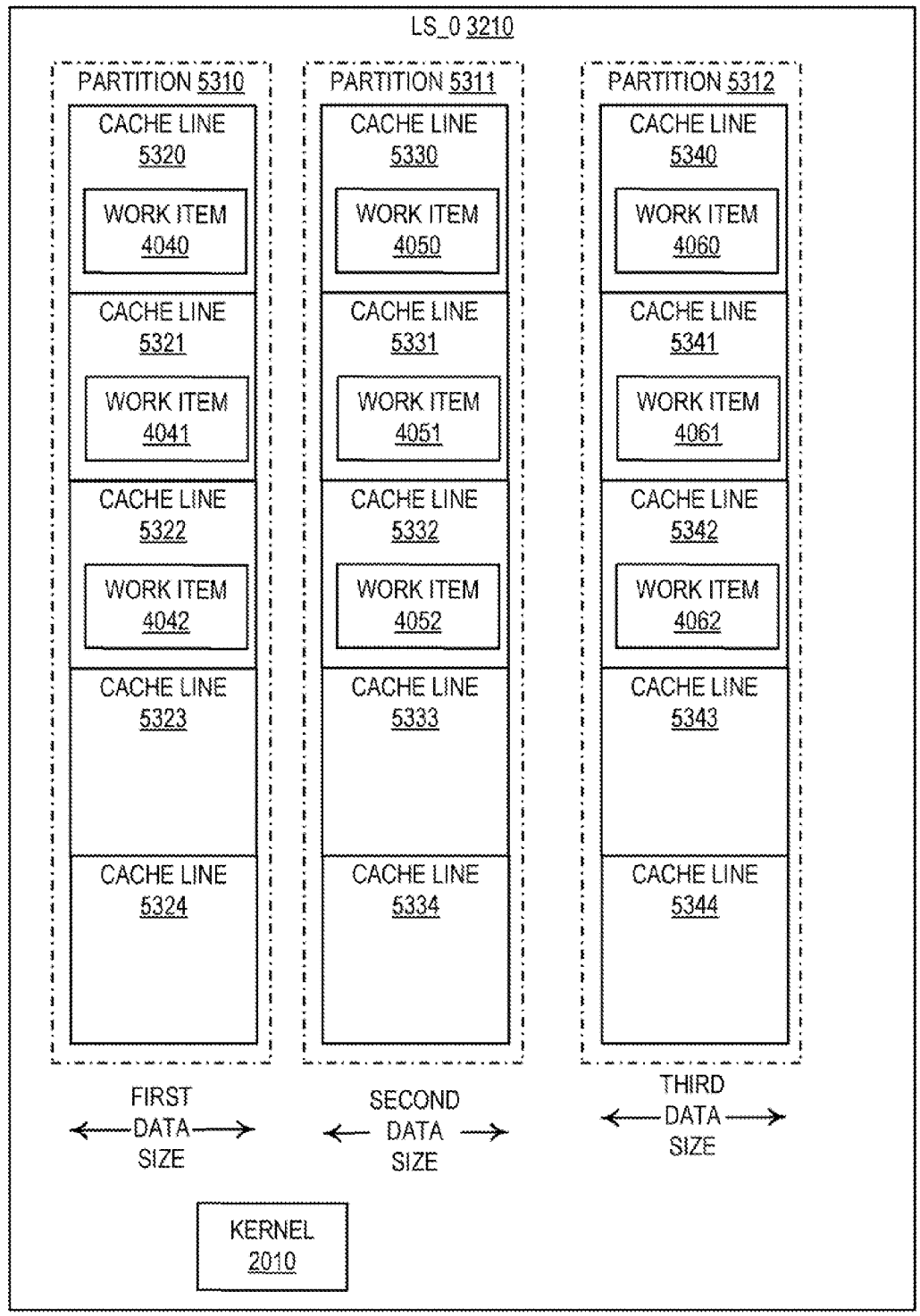

Turning now to FIG. 5A, a block diagram of a local store or memory is illustrated, according to one or more embodiments. As shown, local store or memory 3210 can be partitioned into two or more partitions 5310-5312. In one or more embodiments, partitions 5310-5312 correspond to respective memory objects 4005-4015. In one or more embodiments, one or more attributes of attributes 4100-4102 can be used to partition local store 3210 into two or more partitions 5310-5312.

As shown, partitions 5310-5312 can include respective multiple cache lines 5320-5324, 5330-5334, and 5340-5344. In one or more embodiments, the multiple cache lines can be configured using software (e.g., via API 1340). In one or more embodiments, one or more of the memory object attributes can include information that indicates one or more of a cache size and a cache line size. In one example, the cache size can correspond to a size of a partition. In another example, each of multiple cache lines of a partition can include a data size that can correspond to a cache line size. In one instance, the data size can include a number of bytes for a work item.

As illustrated, cache lines 5320-5324 can include a first data size, cache lines 5330-5334 can include a second data size, and cache lines 5340-5344 can include a third data size.

In one or more embodiments, the first through third data sizes can include the same data size, two of the first through third data sizes can include the same data size, or the first through third data sizes can include respective different data sizes.

In one or more embodiments, one or more of the memory object attributes can include information that indicates one or more of a fault policy and an access policy. In one example, attributes 4100 can include information that indicates a random access policy. In another example, attributes 4100 can include information that indicates a sequential access policy. For instance, the sequential access policy can indicate that one or more work items can be copied to a local store in a speculative fashion. For example, work item 4040 can be copied to local store 3210, and based on a sequential access policy associated with work item 4040 (e.g., inherited from memory object 4005) can indicate that work items 4041-4042 are also copied into local store 3210. As shown, cache lines 5320-5322 can include respective work items 4040-4042, cache lines 5330-5332 can include respective work items 4050-4052, and cache lines 5340-5342 can include respective work items 4060-4062. As illustrated, local store 3210 can include kernel 2010, and local store 3210 can be used to store data and instructions that can be executed on processor core 1110.

Figure 5B:
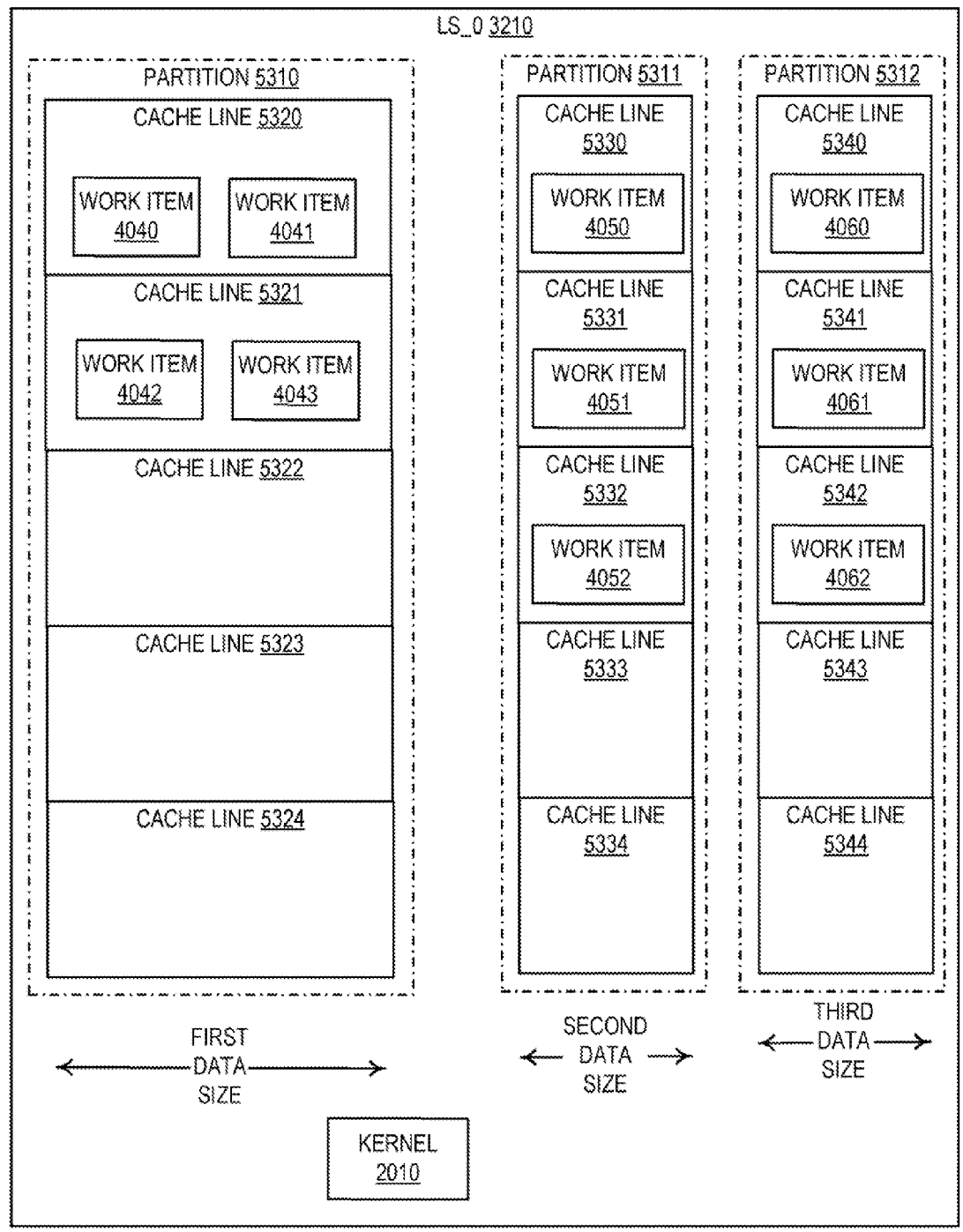

Turning now to FIG. 5B, a block diagram of a local store or memory where multiple work items can occupy a cache line is illustrated, according to one or more embodiments. As shown, local store or memory 3210 can be partitioned into two or more partitions 5310-5312. In one or more embodiments, partitions 5310-5312 correspond to respective memory objects 4005-4015. In one or more embodiments, one or more attributes of attributes 4100-4102 can be used to partition local store 3210 into two or more partitions 5310-5312. In one or more embodiments, a data size can include a number of bytes for multiple work items. For example, a work item can include a bounding volume hierarchy (BVH) node, and the data size can be set to two BVH nodes, since both sibling BVH nodes can be tested in traversing and/or processing a bounding volume hierarchy. As illustrated, cache line 5320 can include work items 4040 and 4041, and cache line 5321 can include work items 4042 and 4043.

Figure 5C:
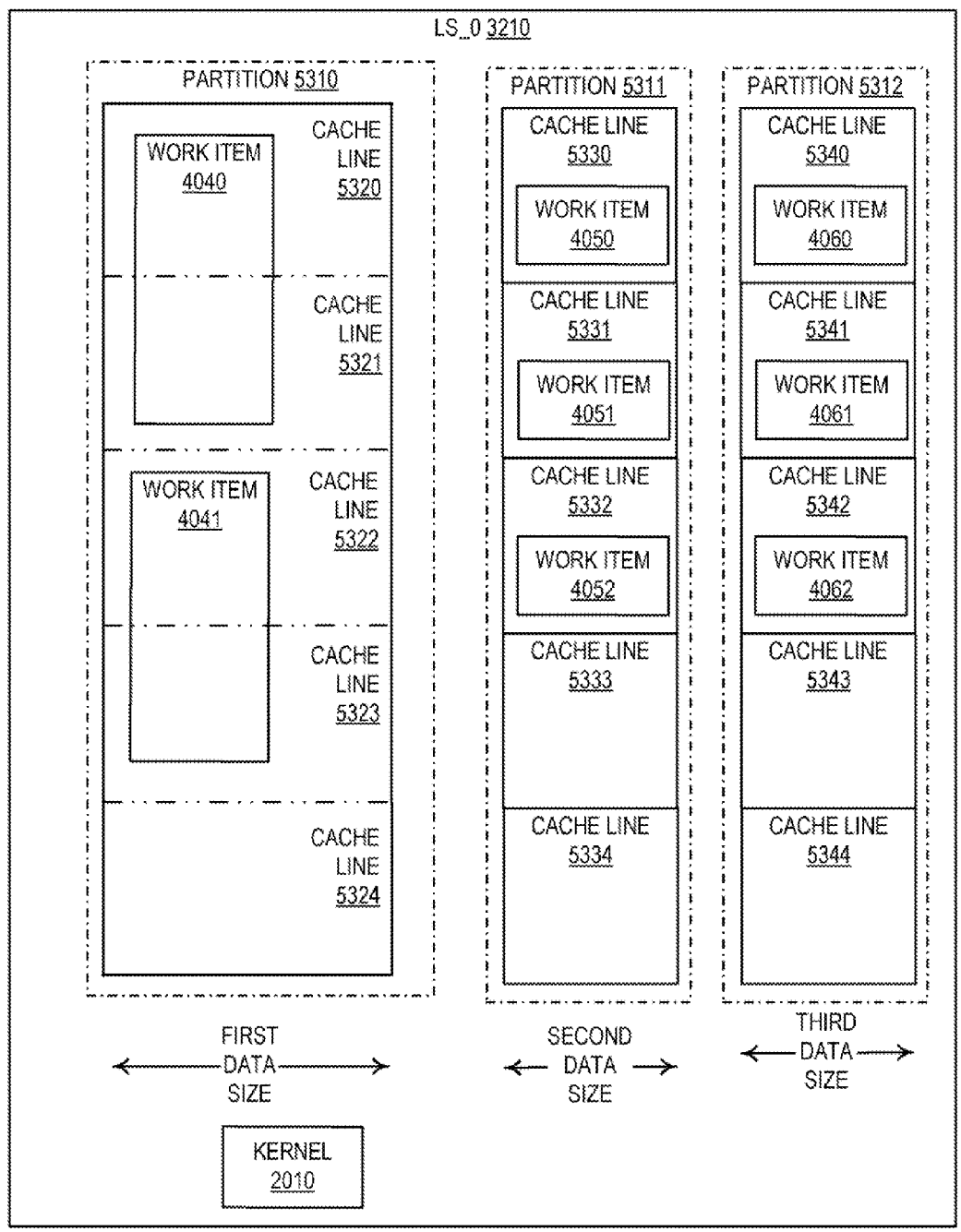

Turning now to FIG. 5C, a block diagram of a local store or memory where a work item can occupy multiple cache lines is illustrated, according to one or more embodiments. As shown, local store or memory 3210 can be partitioned into two or more partitions 5310-5312. In one or more embodiments, partitions 5310-5312 correspond to respective memory objects 4005-4015. In one or more embodiments, one or more attributes of attributes 4100-4102 can be used to partition local store 3210 into two or more partitions 5310-5312. In one or more embodiments, a data size can include a number of bytes that can store a portion of a work item. As illustrated, cache lines 5320 and 5321 can include work item 4040, where cache lines 5320 can include a first portion of work item 4040 and cache line 5321 can include a second portion of work item 4040. As shown, cache lines 5322 and 5322 can include work item 4041, where cache lines 5322 can include a first portion of work item 4041 and cache line 5323 can include a second portion of work item 4041.

Figure 6:
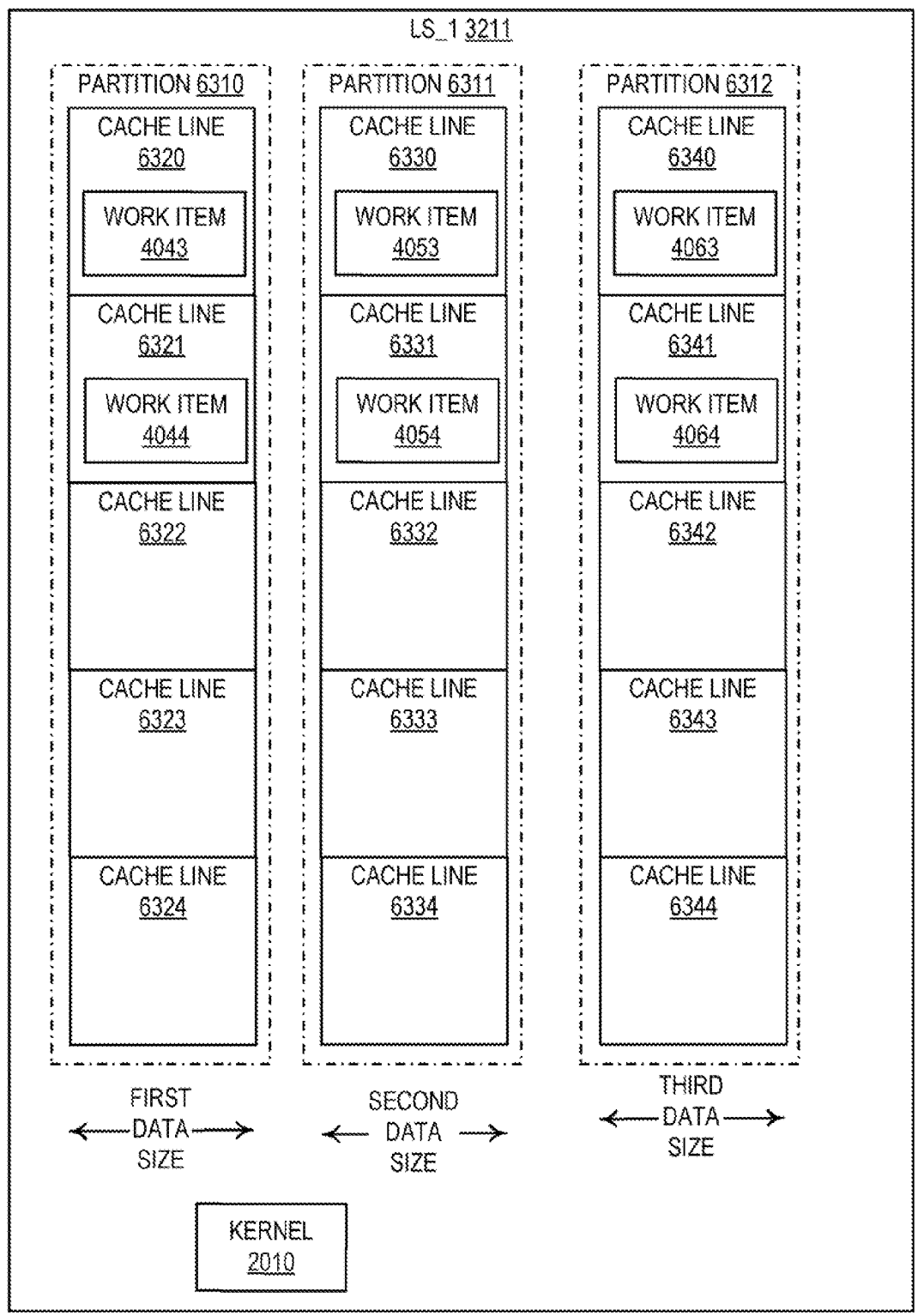

Turning now to FIG. 6, a block diagram of a local store or memory is illustrated, according to one or more embodiments. As shown, local store or memory 3211 can be partitioned into two or more partitions 6310-6312. In one or more embodiments, partitions 6310-6312 correspond to respective memory objects 4005-4015. In one or more embodiments, one or more attributes of attributes 4100-4102 can be used to partition local store 3211 into two or more partitions 6310-6312. As shown, cache lines 6320 and 6321 can include respective work items 4043 and 4044, cache lines 6330 and 6331 can include respective work items 4053 and 4054, and cache lines 6330 and 6331 can include respective work items 4063 and 4064. As illustrated, local store 3211 can include kernel 2010, and local store 3211 can be used to store data and instructions that can be executed on processor core 1111.

Figure 7:
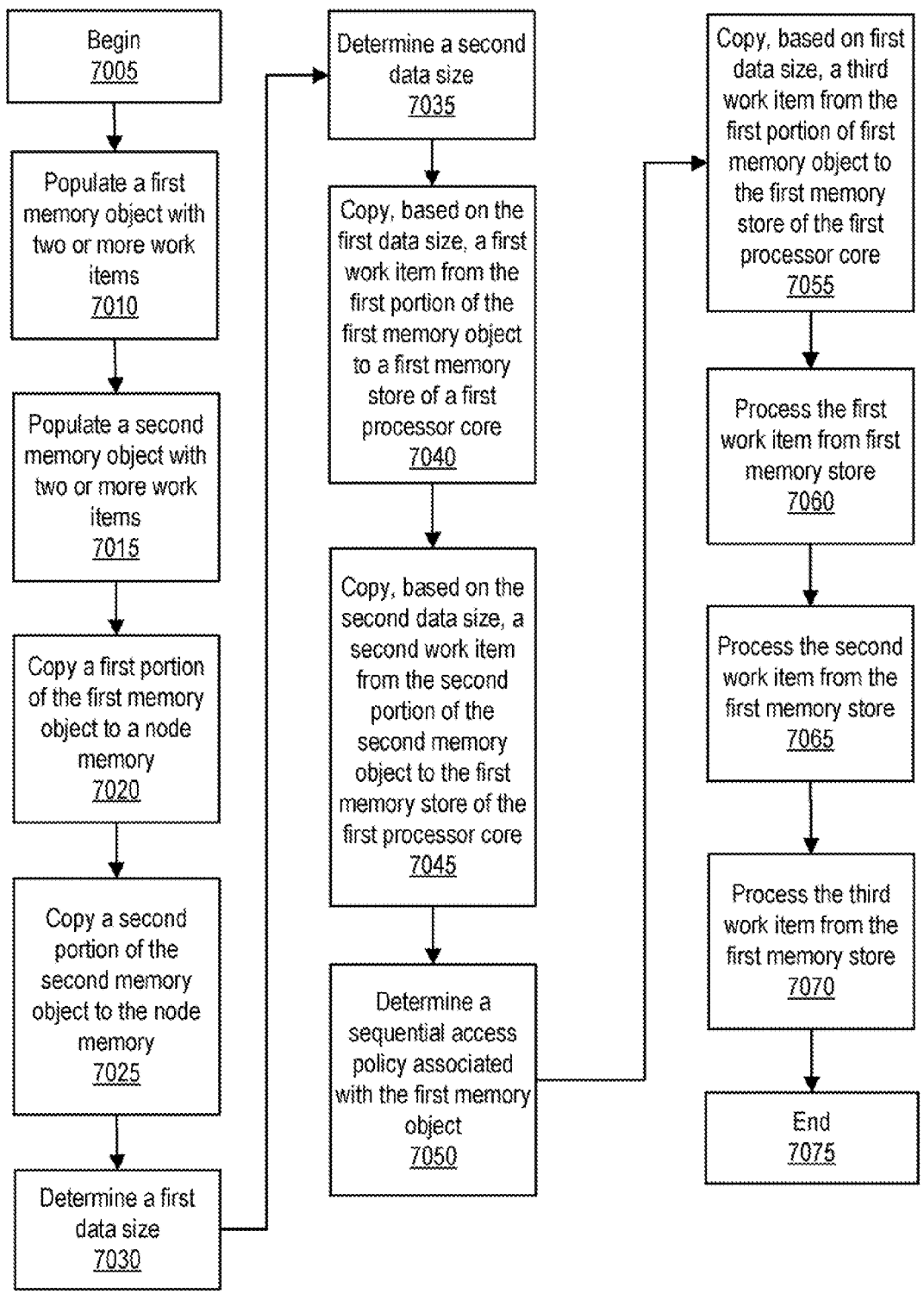

Turning now to FIG. 7, a method of operating a data processing system is illustrated, according to one or more embodiments. The method begins at initiation block 7005. At block 7010, API 1340 can populate a first memory object with two or more work items. For example, API 1340 can populate memory object 4005 with work items 2040. At block 7015, API 1340 can populate a second memory object with two or more work items. For example, API 1340 can populate memory object 4010 with work items 2041. At block 7020, processing node 1100 can copy a first portion of the first memory object to a node memory. For example, processing node 1100 can copy work items 4040-4044 from memory object 4005 to node local memory 1105.

At block 7025, processing node 1100 can copy a second portion of the second memory object to the node memory. For example, processing node 1100 can copy work items 4050-4054 from memory object 4010 to node local memory 1105. At block 7030, processor core 1110 can determine a first data size. For example, processor core 1110 can determine the first data size from attributes 4100. At block 7035, processor core 1110 can determine a second data size. For example, processor core 1110 can determine the second data size from attributes 4101. At 7040, processor core 1110 can copy, based on the first data size, a first work item from the first portion of the first memory object to a first memory store of processor core 1110. For example, processor core 1110 can copy, based on the first data size, work item 4040 from node local memory 1105 to local store 3210. In one or more embodiments, processor core 1110 can include a DMA controller, and the DMA controller can copy, based on the first data size, work item 4040 from node local memory 1105 to local store 3210.

At block 7045, processor core 1110 can copy, based on the second data size, a second work item from the second portion of the second memory object to the first memory store of processor core 1110. For example, processor core 1110 can copy, based on the second data size, work item 4050 from node local memory 1105 to local store 3210. In one or more embodiments, processor core 1110 can include a DMA controller, and the DMA controller can copy, based on the first data size, work item 4050 from node local memory 1105 to local store 3210.

At block 7050, processor core 1110 can determine a sequential access policy associated with the first memory object. For example, processor core 1110 can determine the sequential access policy from attributes 4100. At block 7055, processor core 1110 can copy, based on the first data size, a third work item from the first portion of the first memory object to the first memory store of processor core 1110. For example, processor core 1110 can copy, based on the first data size, work item 4041 from node local memory 1105 to local store 3210. In one or more embodiments, block 7055 can be performed automatically in response to determining the sequential access policy. For example, the sequential access policy can indicate that additional work items can be speculatively cached. For instance, work item 4041 can be a next work item in a sequence after work item 4040. At block 7060, processor core 1110 can process the first work item. At block 7065, processor core 1110 can process the second work item. At block 7070, processor core 1110 can process the third work item. The method then ends at block 7075.

Figure 8:
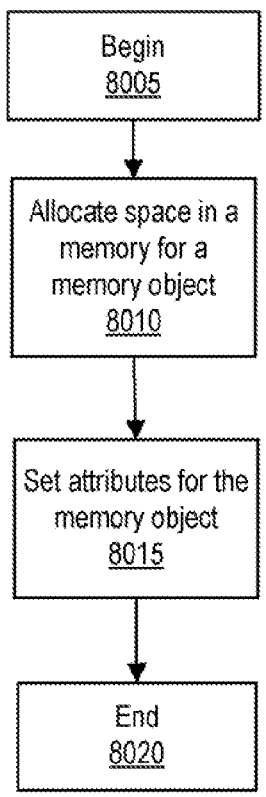
FIG. 8 illustrates a method of creating a memory object, according one or more embodiments.

Turning now to FIG. 8, a method of creating a memory object is illustrated, according to one or more embodiments. The method begins at initiation block 8005. At block 8010, API 1340 can allocate space in a memory for a memory object. For example, API 1340 can allocate space in memory 1405 for memory object 4005. In one or more embodiments, the space allocated for memory object 4005 does not share an address space with another memory object. At block 8015, API 1340 can set attributes associated with the memory object. For example, API 1340 can set attributes 4100. In one or more embodiments, API 1340 can set attributes 4100 to indicate one or more of a cache policy, a cache size, and a cache line size, among others. The method then ends at block 8020.

Figure 9:
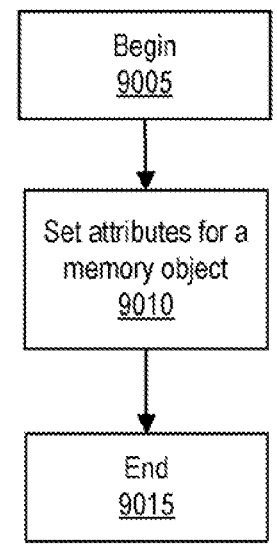
FIG. 9 illustrates a method of setting attributes of a memory object, according to one or more embodiments.

Turning now to FIG. 9, a method of setting attributes of a memory object is illustrated, according to one or more embodiments. The method begins at initiation block 9005. At block 9010, API 1340 can set attributes associated with a memory object. For example, API 1340 can set attributes 4101 for memory object 4010. In one instance, memory object 4010 may have been previously allocated, and API 1340 can set attributes 4101 for memory object 4010. In another instance, memory object 4010 may have been previously associated with attributes 4101, and API 1340 can set one or more different attributes of attributes 4101 for memory object 4010. In one or more embodiments, API 1340 can set attributes 4101 to indicate one or more of a cache policy, a cache size, and a cache line size, among others. The method then ends at block 9015.

Figure 10:
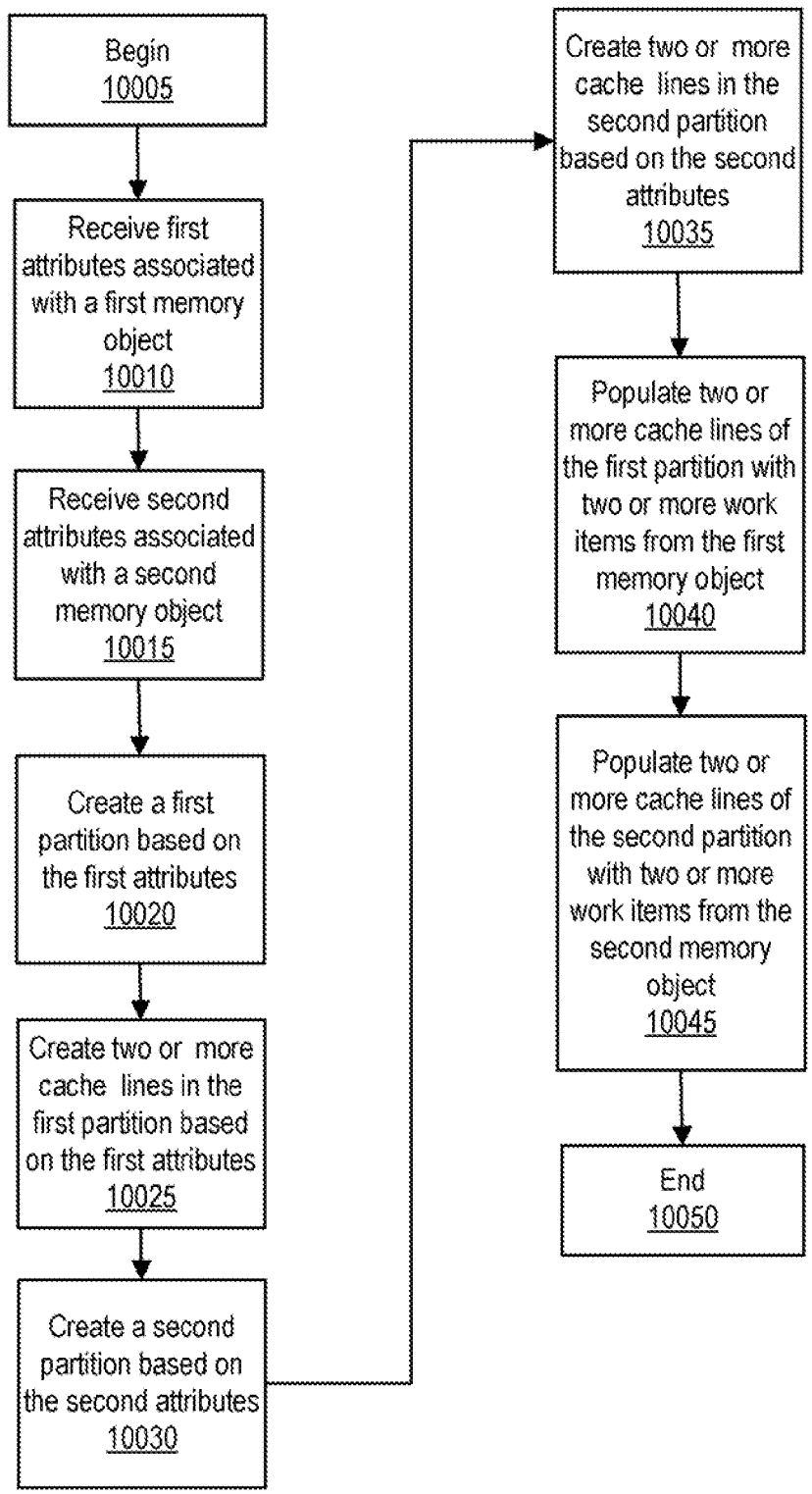
FIG. 10 illustrates a method of setting attributes of a memory object, according to one or more embodiments.

Turning now to FIG. 10, a method of setting attributes of a memory object is illustrated, according to one or more embodiments. The method begins at initiation block 10005. At block 10010, processor 1110 can receive first attributes associated with a first memory object. For example, processor 1110 can receive attributes 4100 associated with memory object 4005. At block 10015, processor 1110 can receive second attributes associated with a second memory object. For example, processor 1110 can receive attributes 4101 associated with memory object 4010. At block 10020, processor 1110 can create a first partition based on the first attributes. For example, processor 1110 can create partition 5310 in local store 3210 based on attributes 4100. At block 10025, processor 1110 can create two or more cache lines in the first partition based on the first attributes. For example, processor 1110 can create cache lines 5320-5324 in partition 5310 based on attributes 4100.

At block 10030, processor 1110 can create a second partition based on the second attributes. For example, processor 1110 can create partition 5311 in local store 3210 based on attributes 4101. At block 10035, processor 1110 can create two or more cache lines in the second partition based on the second attributes. For example, processor 1110 can create cache lines 5330-5334 in partition 5311 based on attributes 4101. At block 10040, processor 1110 can populate two or more cache lines of the first partition with two or more work items. For example, processor 1110 can populate cache lines 5320-5322 with work items 4040-4042. In one or more embodiments, MC_0 3310 of processor 1110 can populate cache lines 5320-5322 with work items 4040-4042.

At block 10045, processor 1110 can populate two or more cache lines of the second partition with two or more work items. For example, processor 1110 can populate cache lines 5330-5332 with work items 4050-4052. In one or more embodiments, MC_0 3310 of processor 1110 can populate cache lines 5330-5332 with work items 4050-4052. The method then ends at block 10050.

Features of the provided embodiments can advantageously be implemented in multi-node processing systems which exhibit low data transfer and cross communication latencies between the processor cores and a memory location of a DPS. Given that the nodes can retrieve work from the central/common command queue, the latency to the command queue for the different nodes can be relative short, such that the overall work retrieval process incurs an acceptable latency penalty in overall processing time for the processing cores that are grabbing work from the command queue.

With the implementation of the single command queue, the need to synchronize across multiple command queues of multiple nodes is substantially eliminated and can allow for dynamic allocation of various subdevices or virtual devices. The described embodiments are adapted for implementation on multi-processor compute systems (or system architecture) that exhibit small penalty (latency) when synchronizing across compute nodes. For example, with NUMA nodes that are connected via a "local" fabric, such as within a single physical system (e.g., processing system 1005), there is a relatively small latency penalty when synchronizing distributed work of a single kernel and work items across multiple nodes. This further enables the expanding/implementing of work and data intensive operations to/on NUMA systems with low cross node latency.

With the described embodiments, multiple individual command queues tied to separate nodes may not be required for NUMA affinity, and a single command queue structure is provided. With the single command queue implementation.

The above embodiments can be applicable to systems that have NUMA regions close enough so they can share the common command/work queue efficiently. This is especially true for workloads where a common function is being executed multiple, independent times. The common/global command queue is used by all NUMA nodes. Each work element in that GCQ then contains an APU mask (NODE-MASK), work remaining count (in the case of multiple iterations of a process) and a seen count. With this configuration, work is scheduled as follows: (a) the processing unit checks if the unit's NUMA bit is set in the next work element's APU mask; (b) if the unit's NUMA bit is not set, the processing unit increments the seen count, indicating that the unit has finished with the work element, and advances to the next element (c) If the unit's NUMA bit is set, the unit decrements the work remaining count by a tunable "chunk size", based on the actual amount of work retrieved from the work element by the processing unit; (d) If the result of the decrement is a value indicating that there is no more work (e.g., 0 or −1), the processing unit increments the seen count, which indicates that the processing unit has finished with the element. The processing unit then advances to the next work element; (e) if the processing unit is the last processor core to see the element (i.e., seen count is equal to zero), indicating all the processor cores have seen the work item at least one, the processing unit marks the location in the global queue as "free."

Certain of the features of the described embodiments may lend themselves to N Dimensional (ND) Range processing/execution paradigms, such as provided by OpenCL™ and similarly structured applications executed on multi-core data processing systems in which an execution command contains the information necessary to efficiently execute and balance work load of the command, which may include data or task parallel processing requirements. Each command includes information corresponding to the total number of work groups within the command to be executed, the number of work groups remaining to be computed, the number of work groups already processed, the number of work groups to process at a time (reservation size). Other information provided by the commands may include the number of execution threads to process in the command and the number of execution threads that have seen the command.

Within this execution paradigm, and according to the presently described embodiments, execution units can process the commands from a single global command queue comprising multiple queue entries. As provided by the described embodiments, the execution units are processing cores, which may be located across a distributed network. However, while processor cores are employed throughout the described and illustrative embodiments as examples of execution units, in other embodiments, the execution units may be any device that executed a command, including, but not limited to, processing cores, CPUs, GPUs, SPUs, threads, and even complete computing systems.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of operating a data processing system, the method comprising:
    populating a first memory object in a global memory with a first plurality of work items;
    populating a second memory object in the global memory with a second plurality of work items, wherein the second memory object does not share a common address space with the first memory object;
    copying a first portion of the first memory object to a node memory;
    receiving a plurality of attributes associated with the first memory object and the second memory object;
    determining a first data size from at least a first attribute of the plurality of attributes that is associated with the first memory object;
    partitioning a memory store of a first processor core of a plurality of processor cores into a plurality of partitions based on the plurality of attributes, wherein each partition stores a plurality of cache lines; and
    copying, based on the first data size, a first work item from the first portion of the first memory object to a first partition of the plurality of partitions of the memory store of the first processor core.

2. The method of claim 1, wherein:
    the plurality of attributes comprise information that indicates one or more of a fault policy and an access policy, wherein the access policy comprises information that indicates one of a random access policy and a sequential access policy; and
    the method further comprising:
    determining a sequential access policy from at least a second attribute associated with the first memory object, wherein the sequential access policy indicates one or more work items that can be speculatively copied to the memory store.

3. The method of claim 2, further comprising:
    in response to said determining the sequential access policy:
        determining a second work item that can be speculatively copied from among the one or more work items that can be speculatively copied; and
        automatically copying, based on the first data size, the second work item from the first portion of the first memory object to the memory store of the first processor core of the plurality of processor cores, wherein the second work item is next in a sequence following the first work item.

4. The method of claim 1, wherein said copying, based on the first data size, the first work item from the first portion of the first memory object to the memory store of the first processor core of the plurality of processor cores includes using a direct memory access (DMA) controller associated with the first processor core.

5. The method of claim 1, further comprising:
    processing the first work item from the memory store; and
    wherein the plurality of attributes comprise information utilized to describe data and/or process data of each memory object, and information utilized to indicate one or more of a cache policy, a cache size, and a cache line size.

6. The method of claim 1, wherein:
    said copying, based on the first data size, the first work item from the first portion of the first memory object to the memory store of the first processor core of the plurality of processor cores includes copying the first work item from the first portion of the first memory object to a first partition of the plurality of partitions; and said plurality of partitions include one partition for each memory object in the global memory.

7. The method of claim 6, further comprising:
copying a second portion of the second memory object to the node memory;
determining a second data size from the plurality of attributes; and
copying, based on the second data size, a second work item from the second portion of the second memory object to a second partition of the plurality of partitions.

8. An article of manufacture embodied as a computer program product comprising:
non-transitory computer readable storage device; and
program code on the computer readable storage device that when executed by a processor, provides functions comprising:
populating a first memory object in a global memory with a first plurality of work items;
populating a second memory object in the global memory with a second plurality of work items, wherein the second memory object does not share a common address space with the first memory object;
copying a first portion of the first memory object to a node memory;
receiving a plurality of attributes associated with the first memory object and the second memory object;
determining a first data size from at least a first attribute of the plurality of attributes that is associated with the first memory object;
partitioning a memory store of a first processor core of a plurality of processor cores into a plurality of partitions based on the plurality of attributes, wherein each partition stores a plurality of cache lines; and
copying, based on the first data size, a first work item from the first portion of the first memory object to a first partition of the plurality of partitions of the memory store of the first processor core.

9. The article of manufacture of claim 8, wherein the program code further comprises code that executes to provide additional functions comprising:
determining a sequential access policy from at least a second attribute associated with the first memory object, wherein the sequential access policy indicates one or more work items that can be speculatively copied to the memory store.

10. The article of manufacture of claim 9, wherein the program code further comprises code that executes to provide additional functions comprising:
in response to said determining the sequential access policy:
determining a second work item that can be speculatively copied from the one or more work items that can be speculatively copied; and
automatically copying, based on the first data size, the second work item from the first portion of the first memory object to the memory store of the first processor core of the plurality of processor cores, wherein the second work item is next in a sequence following the first work item.

11. The article of manufacture of claim 8, wherein said copying, based on the first data size, the first work item from the first portion of the first memory object to the memory store of the first processor core of the plurality of processor cores includes using a direct memory access (DMA) controller associated with the first processor core.

12. The article of manufacture of claim 8, wherein the program code further comprising code that executes to provide additional functions comprising:
processing the first work item from the memory store; and
wherein the plurality of attributes can be used to indicate cache history statistics, including a hit rate and a miss rate, of the partition, and the plurality of attributes include information regarding a data size of a work item.

13. The article of manufacture of claim 8, wherein:
said copying, based on the first data size, the first work item from the first portion of the first memory object to the memory store of the first processor core of the plurality of processor cores includes copying the first work item from the first portion of the first memory object to a first partition of the plurality of partitions; and
said plurality of partitions include one partition for each memory object in the global memory.

14. The article of manufacture of claim 13, wherein the program code further comprising code that executes to provide additional functions comprising:
copying a second portion of the second memory object to the node memory;
determining a second data size from the plurality of attributes; and
copying, based on the second data size, a second work item from the second portion of the second memory object to a second partition of the plurality of partitions.

15. A data processing system, comprising:
a processor;
a global memory coupled to the processor;
a node memory coupled to the global memory;
a first node that includes a plurality of processing cores coupled to the node memory; and
program code that when executed by the processor enables the data processing system to:
populate a first memory object in the global memory with a first plurality of work items;
populate a second memory object in the global memory with a second plurality of work items, wherein the second memory object does not share a common address space with the first memory object;
copy a first portion of the first memory object to the node memory;
receive a plurality of attributes associated with the first memory object and the second memory object;
determine a first data size from at least a first attribute of the plurality of attributes that is associated with the first memory object;
partition a memory store of a first processor core of a plurality of processor cores into a plurality of partitions based on the plurality of attributes, wherein each partition stores a plurality of cache lines; and
copy, based on the first data size, a first work item from the first portion of the first memory object to a first partition of the plurality of partitions of the memory store of the first processor core.

16. The data processing system of claim 15, wherein the program code further comprising code that when executed enables the processor to:
determine a sequential access policy from at least a second attribute associated with the first memory object, wherein the sequential access policy indicates one or more work items that can be speculatively copied to the memory store.

17. The data processing system of claim 16, wherein the program code further comprising code that when executed enables the processor to:
in response to said determining the sequential access policy:
determine a second work item that can be speculatively copied from the one or more work items that can be speculatively copied; and
automatically copy, based on the first data size, the second work item from the first portion of the first memory object to the memory store of the first processor core of the plurality of processor cores, wherein the second work item is next in a sequence following the first work item.

18. The data processing system of claim 15, wherein said program code that enables said processor to copy, based on the first data size, the first work item from the first portion of the first memory object to the memory store of the first processor core of the plurality of processor cores includes program code that enables the processor to copy the first work item using a direct memory access (DMA) controller associated with the first processor core.

19. The data processing system of claim 15, wherein the program code further comprising code that when executed enables the processor to:
process the first work item from the memory store.

20. The data processing system of claim 15, wherein:
said program code that enables the processor to copy, based on the first data size, the first work item from the first portion of the first memory object to the memory store of the first processor core of the plurality of processor cores includes program code that enables the processor to copy the first work item from the first portion of the first memory object to a first partition of the plurality of partitions; and
said plurality of partitions include one partition for each memory object in the global memory.

21. The data processing system of claim 20, wherein the program code further comprising code that when executed enables the processor to:
copy a second portion of the second memory object to the node memory;
determine a second data size from the plurality of attributes; and
copy, based on the second data size, a second work item from the second portion of the second memory object to a second partition of the plurality of partitions.

* * * * *